United States Patent
Chen et al.

(10) Patent No.: US 9,497,022 B2
(45) Date of Patent: Nov. 15, 2016

(54) METHOD AND SYSTEM FOR IMPROVED FAULT TOLERANCE IN DISTRIBUTED CUSTOMIZATION CONTROLS USING NON-VOLATILE MEMORY

(75) Inventors: Iue-Shuenn Chen, San Diego, CA (US); Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 2149 days.

(21) Appl. No.: 11/558,360

(22) Filed: Nov. 9, 2006

(65) Prior Publication Data

US 2008/0022371 A1 Jan. 24, 2008

Related U.S. Application Data

(60) Provisional application No. 60/814,814, filed on Jun. 19, 2006.

(51) Int. Cl.
*H04L 29/06* (2006.01)
*H04L 9/00* (2006.01)

(52) U.S. Cl.
CPC ........... *H04L 9/004* (2013.01); *H04L 2209/12* (2013.01)

(58) Field of Classification Search
None
See application file for complete search history.

(56) References Cited

U.S. PATENT DOCUMENTS

| | | | |
|---|---|---|---|
| 5,485,474 A * | 1/1996 | Rabin | 714/762 |
| 5,491,827 A * | 2/1996 | Holtey | 711/163 |
| 6,490,646 B1 * | 12/2002 | Leydier | 710/301 |
| 8,094,814 B2 | 1/2012 | Chen | |
| 2003/0101419 A1 * | 5/2003 | Yamashita et al. | 716/1 |
| 2006/0221760 A1 | 10/2006 | Chen | |
| 2007/0294761 A1 | 12/2007 | Chen et al. | |

* cited by examiner

*Primary Examiner* — Dao Ho
*Assistant Examiner* — Angela Holmes
(74) *Attorney, Agent, or Firm* — Sterne, Kessler, Goldstein & Fox PLLC

(57) ABSTRACT

Certain aspects of a method and system for improved fault tolerance in distributed customization controls using non-volatile memory are disclosed. Aspects of one method may include mapping an input control signal to a plurality of input logic circuits within a security processor. A plurality of independent processing paths may be defined between each of the plurality of input logic circuits and an output logic circuit. Each of the plurality of independent processing paths may comprise one or more logic circuits. The input control signal may be routed via at least a portion of the plurality of independent processing paths. The portion of the plurality of independent processing paths may be combined in the output logic circuit to generate the input control signal.

12 Claims, 4 Drawing Sheets

METHOD AND SYSTEM FOR IMPROVED FAULT TOLERANCE IN DISTRIBUTED CUSTOMIZATION CONTROLS USING NON-VOLATILE MEMORY

CROSS-REFERENCE TO RELATED APPLICATIONS/INCORPORATION BY REFERENCE

This patent application makes reference to, claims priority to and claims benefit from U.S. Provisional Patent Application Ser. No. 60/814,814, filed on Jun. 19, 2006.

This application makes reference to:
U.S. patent application Ser. No. 11/135,906 filed on May 24, 2005; and
U.S. patent application Ser. No. 11/558,328 filed on Nov. 9, 2006.

Each of the above stated applications is hereby incorporated herein by reference in its entirety.

FIELD OF THE INVENTION

Certain embodiments of the invention relate to secure communication systems. More specifically, certain embodiments of the invention relate to a method and system for improved fault tolerance in distributed customization controls using non-volatile memory.

BACKGROUND OF THE INVENTION

In an increasingly security conscious world, protecting access to information and/or to systems from unwanted discovery and/or corruption is a major issue for both consumers and businesses. Many consumer or business systems may be vulnerable to unwanted access when the level of security provided within the system is not sufficient for providing the appropriate protection. In this regard, consumer systems, such as multimedia systems, for example, may require the use of integrated architectures that enable security management mechanisms for defining and administering user rights or privileges in order to provide the necessary protection from unwanted access.

An example of a multimedia system that may be accessed by many different users may be a set-top box where manufacturers, vendors, operators, and/or home users may have an interest in accessing or restricting at least some limited functionality of the system. In some instances, a single device, such as a security processor for example, may be utilized to administer security operations in the multimedia system. The security processor may operate independently of other components in the multimedia system when determining rights or privileges of different users to various features in the multimedia system. For example, vendors may have limited access to some of the functions that may be accessible by the manufacturer. Home users may only have access to a subset of the vendors' access rights. In some instances, secure operations may be managed by specifying, in a single location, secure conditions for each security component supported by the system.

Test modes for modern set-top boxes (STBs) may be protected by a plurality of secure authentication mechanisms. Authentication mechanisms in a STB may be required to authenticate a single user or multiple users. In STB applications such as accessing system buses and interfaces, a user may need to provide specific information to enable the system to confirm its identity. The information may be in the form of passwords or responses by the user to the STB challenges.

One of the common approaches to authenticating a user identity is the use of passwords. For example, the user may provide a password, and the STB may validate the password. If the password is associated with the user, that user's identity may be authenticated. If the password is not associated with the user, the password may be rejected and the authentication may fail.

A common hidden unreadable value may be stored in a chip to generate the password. A secure passing algorithm, for example, an algorithm modified from advanced encryption standard (AES) may be enabled to protect the password from an attacker trying to guess it. The password scheme may be used for preventing unauthorized users to access security sensitive areas of a device, for example, observing and controlling test access ports (TAPs) on a software controlled basis. One of the problems associated with passwords are that they are reusable. If an attacker breaks a password, he may later reuse the password to gain access to other STBs. A set-top box (STB) may not be able to distinguish between an attacker and a legitimate user.

On a typical security system, the number of user modes and security components may be sufficiently large that the size of the security management and/or control information may require large amounts of memory. There may be a significant number of access control entries that may correspond to instances when access rights may not be granted and/or instances when the access rights may be the same for multiple user modes and/or for multiple security components, such as default settings, for example. The addition or removal of user modes or security components may pose various implementation challenges, which may increase hardware and/or software complexity. As software and/or hardware complexity increases, it may become more challenging to manage security operations without introducing security breaches or other concerns.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for improved fault tolerance in distributed customization controls using non-volatile memory, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for improved fault tolerance in distributed customization controls using non-volatile memory. Certain aspects of the invention may include mapping an input control signal to a plurality of input logic circuits within a security processor. A plurality of independent processing paths may be defined between each of the plurality of input logic circuits and an output logic circuit. Each of the plurality of independent processing paths may comprise one or more logic circuits. The input control signal may be routed via at least a portion of the plurality of independent processing paths. The portion of the plurality of independent processing paths may be combined in the output logic circuit to generate the input control signal.

Figure 1A:
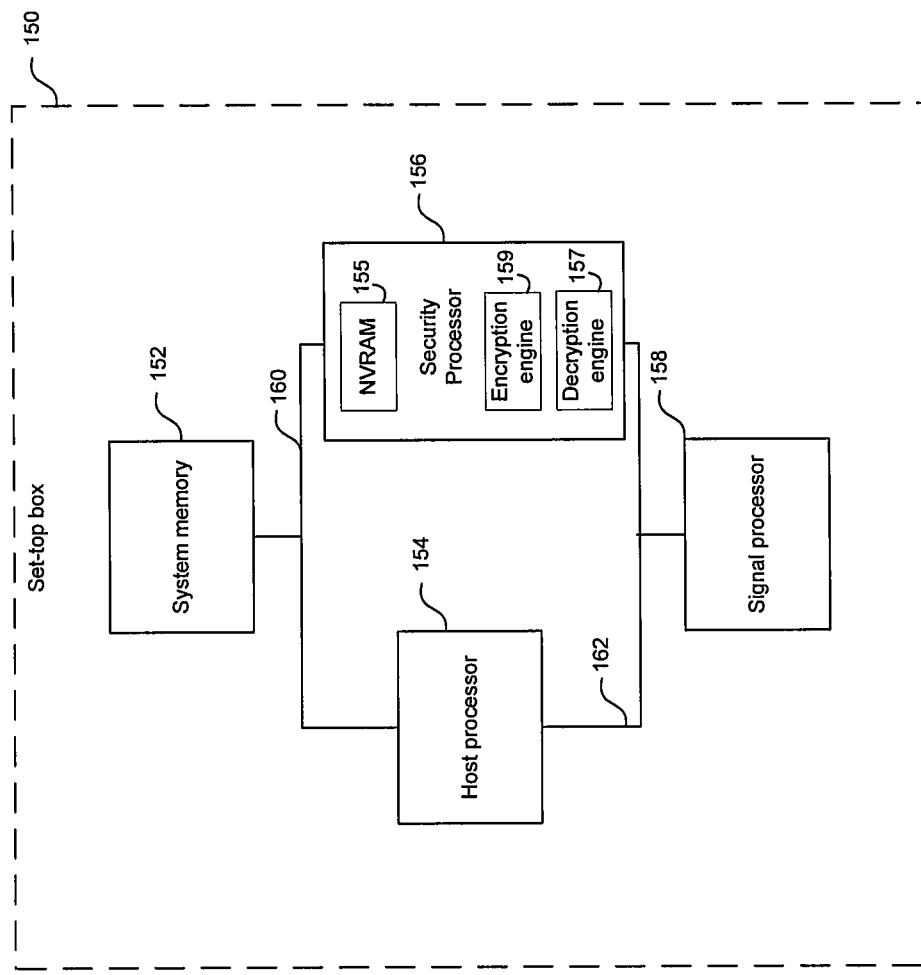
FIG. 1A is a block diagram illustrating an exemplary set-top box with a security processor, in accordance with an embodiment of the invention.

FIG. 1A is a block diagram illustrating an exemplary set-top box with a security processor, in accordance with an embodiment of the invention. Referring to FIG. 1A, there is shown a set-top box 150 that may comprise a host processor 154, a system memory 152, a security processor 156, a signal processor 158, a memory bus 160, and a data bus 162. The security processor 156 may comprise an encryption engine 159, a decryption engine 157, and a non-volatile random access memory (NVRAM) 155.

The host processor 154 may comprise suitable logic, circuitry, and/or code that may be enabled to perform data processing and/or system control operations associated with the set-top box 150. The host processor 154 may be enabled to communicate with the system memory 152 via, for example, the memory bus 160 and with the security processor 156 and/or the signal processor 158 via, for example, the data bus 162. The system memory 152 may comprise suitable logic, circuitry, and/or code that may be enabled to store data, control information, and/or operational information. The security processor 156 may comprise suitable logic, circuitry, and/or code that may be enabled to perform multiple security operations on data received by the set-top box 150. The security operations may include, but need not be limited to, non-volatile memory (NVM) security, "key ladders," which may be designed for cryptographically wrapping/unwrapping keys, challenge-response authentication, memory data signature verification, secure scrambler configuration, and security assurance logic, for example. In this regard, the security processor 156 may comprise multiple security components to perform the features associated with the security operations. For example, the NVRAM 155 may be a security component. The signal processor 158 may comprise suitable logic, circuitry, and/or code that may be enabled to perform a plurality of processing operations on the data received by the set-top box 150. The set-top box may utilize at least one signal processor 158.

In operation, the security processor 156 may receive an access request from a user to perform a certain data operation within the set-top box 150. The security processor 156 may verify access rights or privileges that the user may have to a security component in the security processor 156 based on a securely stored access control matrix. The security processor 156 may determine whether access to a security component may be provided independently of the host processor 154, that is, the security processor 156 may not operate as a slave to the host processor 154. When access to the security component is verified, the security processor 156 may perform the security feature or features associated with the security component. In some instances, the security processor 156 may transfer the results of the operations associated with the security component to, for example, the host processor 154 and/or the signal processor 158. Moreover, the security processor 156 may utilize information stored in the system memory 152 when performing certain security operations associated with security features.

Figure 1B:
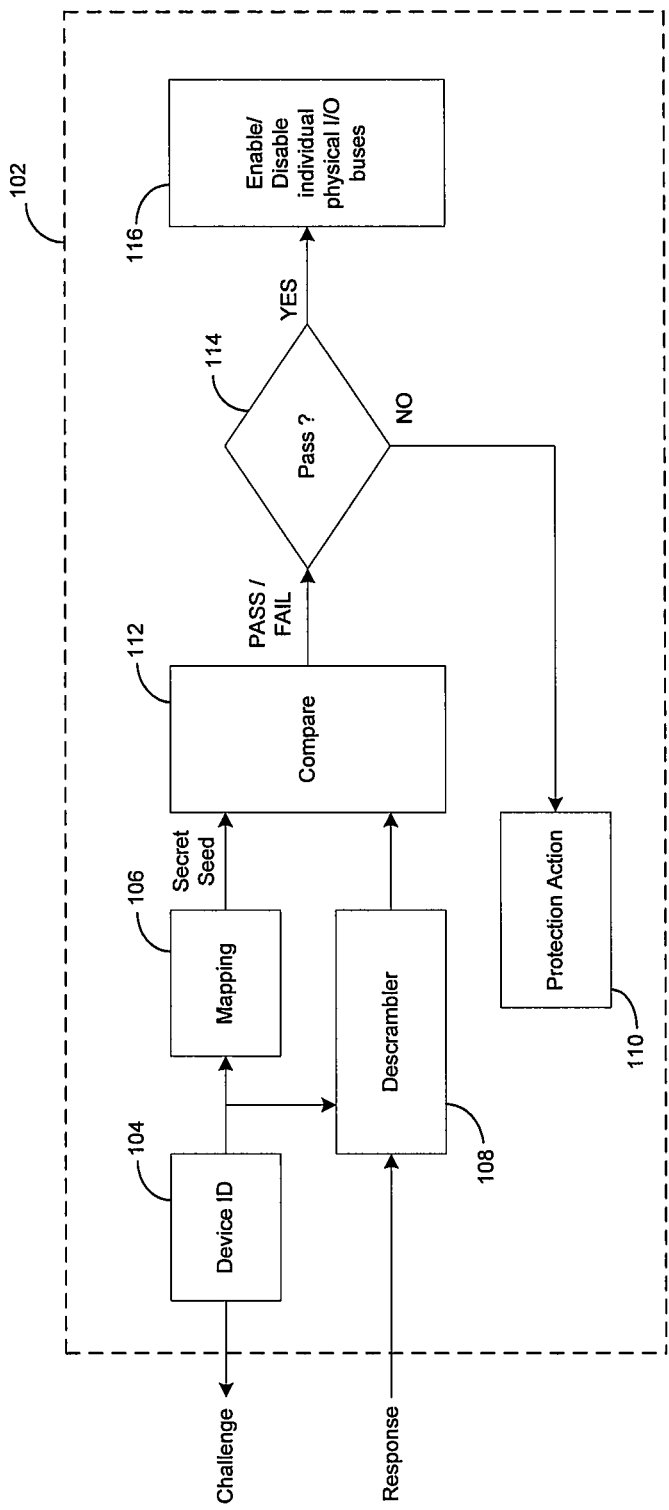
FIG. 1B is a block diagram illustrating an exemplary set-top box (STB) challenge-response process, in accordance with an embodiment of the invention.

FIG. 1B is a block diagram illustrating a set-top box (STB) challenge-response process, in accordance with an embodiment of the invention. Referring to FIG. 1B, there is shown a set-top box (STB) 102. The STB 102 may comprise a device ID block 104, a mapping block 106, a descrambler block 108, a protection action block 110, a compare block 112, a decision block 114 and an enable/disable block 116.

The device ID block 104 may comprise suitable logic, circuitry and/or code that may be enabled to store a unique readable device ID. The mapping block 106 may comprise suitable logic, circuitry and/or code that may be enabled to store a table of values to map the device ID stored in the device ID block 104 and generate a corresponding secret seed. The descrambler block 106 may comprise suitable logic, circuitry and/or code that may be enabled to store a corresponding unique unreadable key to the device ID stored in the device ID block 104. The compare block 114 may comprise suitable logic, circuitry and/or code that may be enabled to compare the device ID stored in the device ID block 104 with its unique key stored in the descrambler block 108. In an alternative embodiment of the invention, the device ID stored in the device ID block 104 may be compared with its unique key stored in the descrambler block 108 by the STB 102. The enable block 116 may comprise suitable logic, circuitry and/or code that may enable at least one of the plurality of physical I/O buses. The protection action block 110 may comprise suitable logic, circuitry and/or code that may be enabled to reject a user from accessing the set-top box 102 if authentication fails.

If the device ID stored in the device ID block 104 matches its corresponding unique key stored in the descrambler block 108, control passes to the enable block 116. The enable/disable block 116 may be enabled to enable/disable at least one of the plurality of physical I/O buses. If the device ID stored in the device ID block 104 does not match its corresponding unique key stored in the descrambler block 108, authentication may fail and control passes to the protection action block 110. The protection action block 110 may be enabled to reject a user from accessing the set-top box 102 if authentication fails.

The set-top box 102 may be enabled to have an n-bit, for example, 64-bit unique readable device ID and a corresponding unique unreadable key in the descrambler block 108, both of which may be known to an authorizing entity. The size of the device ID may be implementation dependent. The unique device ID stored in the device ID block 104 and its corresponding key stored in the descrambler block 108 may be utilized to authenticate the STB 102. In order to keep the key value hidden, only the device ID stored in the device ID block 104 generating the challenge may be readable. The compare block 112 may be enabled to compare the device ID stored in the device ID block 104 with its unique key stored in the descrambler block 108 for a given STB 102, using a table of values stored in the mapping block 106 known only to the authorizing entity to generate a response. The response may be utilized as the unique password for the STB 102 to access security sensitive areas or functions of the device.

Figure 2:
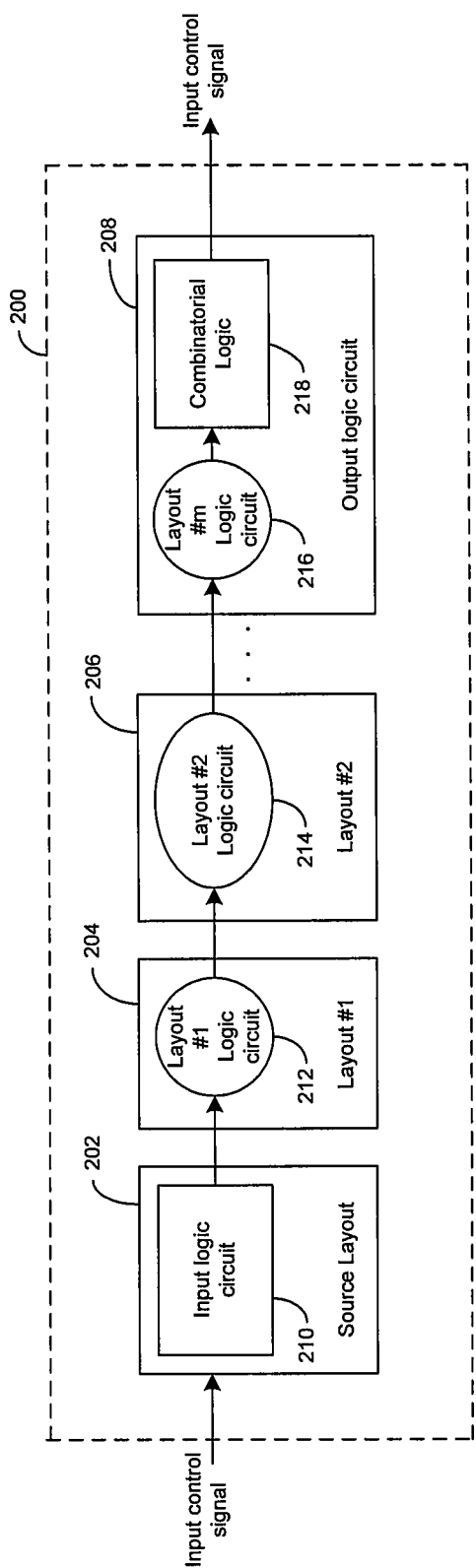
FIG. 2 is a block diagram of an exemplary independent processing path for fault tolerance in distributed customization controls using non-volatile memory, in accordance with an embodiment of the invention.

FIG. 2 is a block diagram of an exemplary independent processing path for fault tolerance in distributed customization controls using non-volatile memory, in accordance with an embodiment of the invention. Referring to FIG. 2, there is shown an independent processing path 200. The independent processing path 200 may comprise a source layout block 202, a plurality of layout blocks, for example, layout 1 block 204, layout 2 block 206, and an output logic circuit block 208. The source layout block 202 may comprise at least one input logic circuit 210. The layout 1 block 204 may comprise at least one logic circuit, for example, layout 1 logic circuit 212. The layout 2 block 206 may comprise at least one logic circuit, for example, layout 2 logic circuit 214. The output logic circuit block 208 may comprise at least one logic circuit, for example, layout m logic circuit 216 and a combinatorial logic circuit 218.

The input control signal may be mapped to an input logic circuit 210 within the source layout block 202. The independent processing path 200 may be defined between the input logic circuit 210 and the output logic circuit 208. The input control signal may be routed via at least a portion of the independent processing path 200. The independent processing path 200 may be combined by a combinatorial logic circuit 218 within the output logic circuit 208 to generate the input control signal.

In accordance with an embodiment of the invention, the control signal may be routed via at least a portion of the independent processing path 200 to conceal the mapping or control function of the control signal and enhance physical security. For example, the mapped input control signal may be routed via the input logic circuit 210, the layout 1 logic circuit 212, the layout 2 logic circuit 214, and the layout m logic circuit 216 to conceal the mapping or control function of the control signal and enhance physical security.

The input logic circuit 210 may be one of a non-volatile memory, a secure flash electrically erasable programmable read only memory (EEPROM), a flash RAM, and/or a flip-flop, for example. The output logic circuit 208 may be one of a non-volatile memory, a secure flash EEPROM, a flash RAM, and/or a flip-flop, for example. The plurality of logic circuits within the independent processing path 200, for example, layout 1 logic circuit 212, layout 2 logic circuit 214 and layout m logic circuit 216 may be one of a non-volatile memory, a secure flash EEPROM, a flash RAM, and/or a flip-flop.

Figure 3:
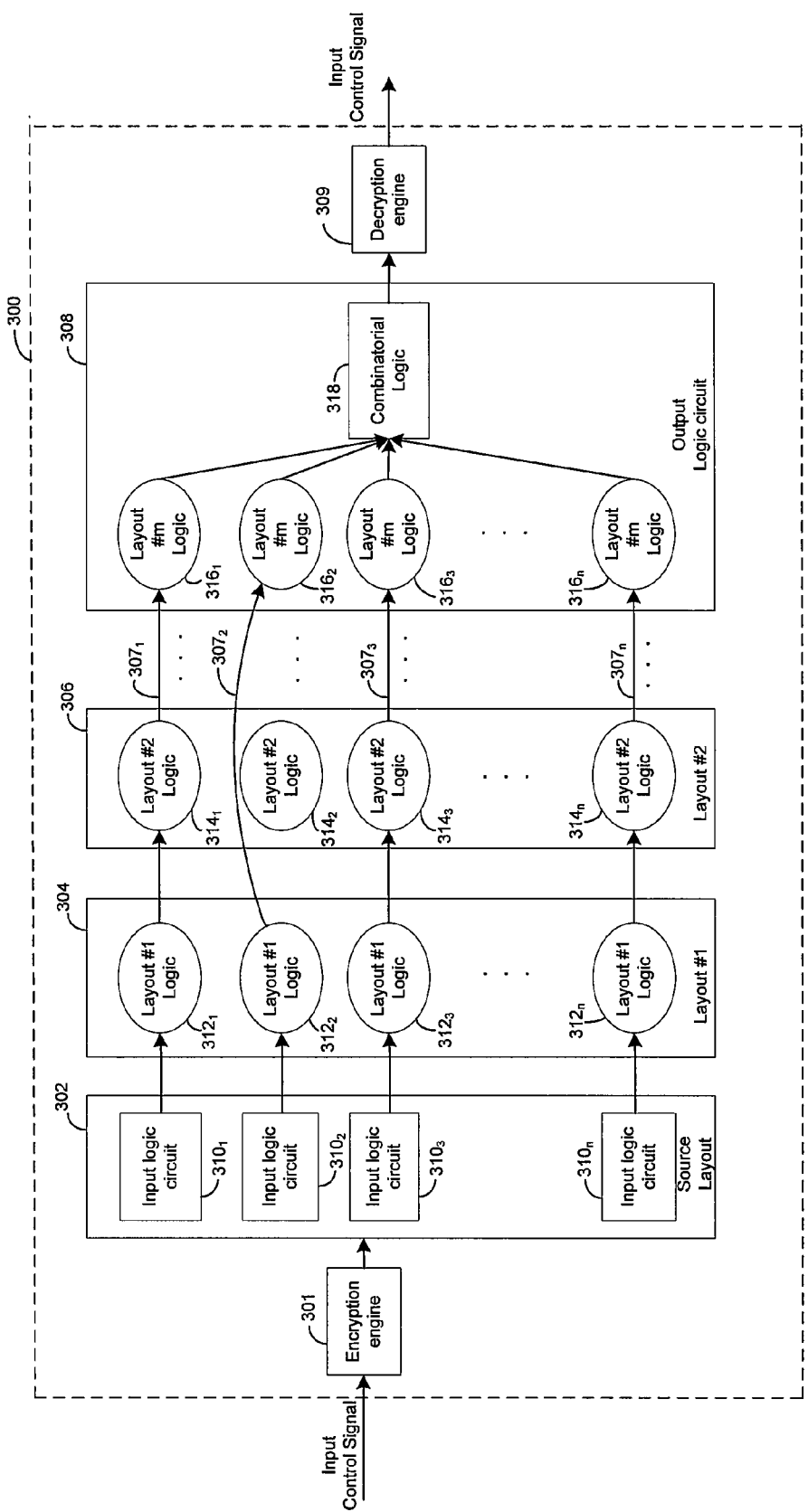
FIG. 3 is a block diagram of an exemplary fault tolerance system, in accordance with an embodiment of the invention.

FIG. 3 is a block diagram of an exemplary fault tolerance system, in accordance with an embodiment of the invention. Referring to FIG. 3, there is shown a security processor 300. The security processor 300 may comprise a plurality of independent processing paths $307_{1...n}$, a source layout block 302, a plurality of layout blocks, for example, layout 1 block 304, layout 2 block 306, an output logic circuit block 308, an encryption engine 301, and a decryption engine 309. The source layout block 302 may comprise a plurality of input logic circuits $310_{1...n}$. The layout 1 block 304 may comprise a plurality of logic circuits, for example, layout 1 logic circuits $312_{1...n}$. The layout 2 block 306 may comprise a plurality of logic circuits, for example, layout 2 logic circuits $314_{1...n}$. The output logic circuit block 308 may comprise a plurality of logic circuits, for example, layout m logic circuits $316_{1...n}$ and a combinatorial logic circuit 318.

The input control signal may be mapped to a plurality of input logic circuits $310_{1...n}$ within the source layout block 302. The plurality of independent processing paths $307_{1...n}$ may be defined between the plurality of input logic circuits $310_{1...n}$ and the output logic circuit 308. Each independent processing path may comprise one input logic circuit, one or more layout blocks, and the output logic circuit block 318. For example, the independent processing path $307_1$ may comprise the input logic circuit $310_1$, the layout 1 block 304, and layout 2 block 306, and the output logic circuit block 318. The input control signal may be routed via at least a portion of the plurality of independent processing paths $307_{1...n}$ as defined. For example, the mapped input control signal may be routed via the input logic circuit $310_1$, the layout 1 logic circuit $312_1$, the layout 2 logic circuit $314_1$, and the layout m logic circuit $316_1$. Notwithstanding, the mapped input control signal may be routed via the input logic circuit $310_2$, layout 1 logic circuit $312_2$, and layout m logic circuit $316_2$. At least a portion of the independent processing paths $307_{1...n}$ may be combined by a combinatorial logic circuit 318 within the output logic circuit 308 to generate the input control signal. For example, a portion of the plurality of independent processing paths, $307_1$, $307_2$, $307_3$, $307_4$, and $307_n$ may be combined by the combinatorial logic circuit 318 within the output logic circuit 308 to generate the input control signal.

In accordance with an embodiment of the invention, the control signal may be routed via at least a portion of the plurality of independent processing paths $307_{1...n}$ as defined to conceal the mapping or control function of the control signal and enhance physical security. For example, the mapped input control signal may be routed via the input logic circuit $310_1$, the layout 1 logic circuit $312_1$, the layout 2 logic circuit $314_1$, and the layout m logic circuit $316_1$ to conceal the mapping or control function of the control signal and enhance physical security.

The encryption engine 301 may comprise suitable logic, circuitry, and/or code that may be enabled to encrypt the input control signal before mapping the input control signal to the plurality of input logic circuits $310_{1...n}$. The decryption engine 309 may comprise suitable logic, circuitry, and/or code that may be enabled to decrypt the encrypted input control signal after combining the portion of independent processing paths $307_{1...n}$ in an output logic circuit 308 to generate the input control signal.

The plurality of input logic circuits $310_{1...n}$ may be one of a non-volatile memory, a secure flash EEPROM, a flash RAM, and/or a flip-flop, for example. The output logic circuit 308 may be one of a non-volatile memory, a secure flash EEPROM, a flash RAM, and/or a flip-flop, for example. The plurality of logic circuits within the independent processing paths $307_{1...n}$ may be one of a non-volatile memory, a secure flash EEPROM, a flash RAM, and/or a flip-flop. For example, the plurality of logic circuits, layout 1 logic circuits $312_{1...n}$, layout 2 logic circuits $314_{1...n}$ and layout m logic circuits $316_{1...n}$ may be one of a non-volatile memory, a secure flash EEPROM, a flash RAM, and/or a flip-flop.

In accordance with an embodiment of the invention, a method and system for improved fault tolerance in distributed customization controls using non-volatile memory may comprise the security processor 300 in which an input control signal is mapped to a plurality of input logic circuits $310_{1...n}$. The security processor 300 may comprise a plurality of independent processing paths $307_{1...n}$ between each of the plurality of input logic circuits $310_{1...n}$ and the output logic circuit 308. Each of the plurality of independent processing paths $307_{1...n}$ may comprise one or more logic circuits. In accordance with an embodiment of the invention, one or more logic circuits may be non-functional. For example, the independent processing path $307_1$ may comprise the input logic circuit $310_1$, the layout 1 block 304, and layout 2 block 306, and the output logic circuit block 318. The input control signal may be routed via at least a portion of the plurality of defined independent processing paths $307_{1...n}$. For example, the mapped input control signal may be routed via the input logic circuit $310_1$, the layout 1 logic circuit $312_1$, the layout 2 logic circuit $314_1$, and the layout m logic circuit $316_1$. A portion of the plurality of independent processing paths $307_{1...n}$ may be combined in the output logic circuit 308 to generate the input control signal.

The input control signal may be encrypted by the encryption engine 301 before mapping the input control signal to the plurality of input logic circuits $310_{1...n}$. The encrypted input control signal may be decrypted by the decryption engine 309 after combining the portion of independent processing paths $307_{1...n}$ in the output logic circuit 308 to generate the input control signal.

The plurality of input logic circuits $310_{1...n}$ within the security processor 300 may be one of a non-volatile memory, a secure flash EEPROM, a flash RAM, and/or a flip-flop, for example. The output logic circuit 308 within the security processor 300 may be one of a non-volatile memory, a secure flash EEPROM, a flash RAM, and/or a flip-flop, for example. The logic circuits within each of the independent processing paths $307_{1...n}$ may be one of a non-volatile memory, a secure flash EEPROM, a flash RAM, and/or a flip-flop, for example.

Another embodiment of the invention may provide a machine-readable storage, having stored thereon, a computer program having at least one code section executable by a machine, thereby causing the machine to perform the steps as described above for improved fault tolerance in distributed customization controls using non-volatile memory.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing information in a communication system, the method comprising:
    encrypting an input control signal;
    mapping said encrypted input control signal to a plurality of input logic circuits;
    routing said mapped encrypted input control signal via at least a portion of a plurality of independent processing paths between each of said plurality of input logic circuits and an output logic circuit, wherein each of said plurality of independent processing paths comprises at least one logic circuit;
    combining outputs of said at least a portion of said plurality of independent processing paths in said output logic circuit to re-generate said encrypted input control signal; and
    decrypting said encrypted input control signal after said combining.

2. The method according to claim 1, wherein each of said plurality of input logic circuits is one or more of: a non-volatile memory, a secure flash electrically erasable programmable read only memory (EEPROM), a flash RAM, and a flip-flop.

3. The method according to claim 1, wherein said output logic circuit is one of: a non-volatile memory, a secure flash electrically erasable programmable read only memory (EEPROM), a flash RAM, and a flip-flop.

4. The method according to claim 1, wherein said at least one logic circuit is one or more of: a non-volatile memory, a secure flash electrically erasable programmable read only memory (EEPROM), a flash RAM, and a flip-flop.

5. A non-transitory machine-readable storage having stored thereon, a computer program having at least one code section for processing information in a communication system, the at least one code section being executable by a machine for causing the machine to perform operations comprising:
    encrypting an input control signal;
    mapping said encrypted input control signal to a plurality of input logic circuits;
    routing said mapped encrypted input control signal via at least a portion of a plurality of independent processing paths between each of said plurality of input logic circuits and an output logic circuit, wherein each of said plurality of independent processing paths comprises at least one logic circuit;
    combining outputs of said at least a portion of said plurality of independent processing paths in said output logic circuit to re-generate said encrypted input control signal; and
    decrypting said encrypted input control signal after said combining.

6. The non-transitory machine-readable storage according to claim 5, wherein each of said plurality of input logic circuits is one or more of: a non-volatile memory, a secure flash electrically erasable programmable read only memory (EEPROM), a flash RAM, and a flip-flop.

7. The non-transitory machine-readable storage according to claim 5, wherein said output logic circuit is one of: a non-volatile memory, a secure flash electrically erasable programmable read only memory (EEPROM), a flash RAM, and a flip-flop.

8. The non-transitory machine-readable storage according to claim 5, wherein said at least one logic circuit is one or more of: a non-volatile memory, a secure flash electrically erasable programmable read only memory (EEPROM), a flash RAM, and a flip-flop.

9. A system for processing information, the system comprising:
one or more circuits configured to:
encrypt an input control signal;
map said encrypted input control signal to a plurality of input logic circuits;
route said mapped encrypted input control signal via at least a portion of a plurality of independent processing paths between each of said plurality of input logic circuits and an output logic circuit, wherein each of said plurality of independent processing paths comprises at least one logic circuit;
combine outputs of said at least a portion of said plurality of independent processing paths in said output logic circuit to re-generate said encrypted input control signal; and
decrypt said encrypted input control signal after said combining.

10. The system according to claim 9, wherein each of said plurality of input logic circuits is one or more of: a non-volatile memory, a secure flash electrically erasable programmable read only memory (EEPROM), a flash RAM, and a flip-flop.

11. The system according to claim 9, wherein said output logic circuit is one of: a non-volatile memory, a secure flash electrically erasable programmable read only memory (EEPROM), a flash RAM, and a flip-flop.

12. The system according to claim 9, wherein said at least one logic circuit is one or more of: a non-volatile memory, a secure flash electrically erasable programmable read only memory (EEPROM), a flash RAM, and a flip-flop.

* * * * *